US006609117B2

(12) United States Patent
Sutherland et al.

(10) Patent No.: US 6,609,117 B2
(45) **Date of Patent: *Aug. 19, 2003**

(54) SYSTEM AND METHOD FOR DISTRIBUTING POSTAGE OVER A PUBLIC NETWORK, ENABLING EFFICIENT PRINTING OF POSTAL INDICIA ON ITEMS TO BE MAILED AND AUTHENTICATING THE PRINTED INDICIA

(75) Inventors: Andrew V. Sutherland, Concord, MA (US); Michael R. Klugerman, Belmont, MA (US); Frank M. D'Ippolito, Arlington, MA (US)

(73) Assignee: The Escher Group, Ltd., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/023,084

(22) Filed: Dec. 17, 2001

(65) Prior Publication Data

US 2002/0083007 A1 Jun. 27, 2002

Related U.S. Application Data

(63) Continuation of application No. 09/167,393, filed on Oct. 6, 1998, now Pat. No. 6,349,292.

(60) Provisional application No. 60/061,705, filed on Oct. 6, 1997.

(51) Int. Cl.[7] .......................... G06F 17/60; H04K 1/00; H04L 9/00

(52) U.S. Cl. .......................... 705/62; 705/60; 705/401; 705/405; 705/408; 705/410

(58) Field of Search .......................... 705/60, 62, 401, 705/405, 408, 410

(56) References Cited

U.S. PATENT DOCUMENTS 4,351,982 A * 9/1982 Miller et al. .................. 380/30

(List continued on next page.)

FOREIGN PATENT DOCUMENTS

DE 3644229 A1 * 7/1987 ........... G07B/17/04

(List continued on next page.)

OTHER PUBLICATIONS

Neopost: Neopost Introduces Internet–Based Postage Metering System for the Small Office/Home Office Market. Mar. 09, 1998. Retrieved online Nov. 14, 2002 [DIALOG].*

(List continued on next page.)

*Primary Examiner*—James P. Trammell
*Assistant Examiner*—James A. Reagan
(74) *Attorney, Agent, or Firm*—Cesari and McKenna, LLP

(57) ABSTRACT

A system is disclosed for distributing postage over a public network in a manner that is secure in the case of third party interception, indicia for which can be efficiently printed by a postal customer on items to be mailed, and that facilitates authentication of the printed indicia. When the postal customer purchases postage from the postal service, the postal service provides information which the postal customer uses to generate pseudo-random numbers associated with the respective units of postage. When the postal customer prints an indicium for a respective unit, it appends the associated pseudo-random number, which the postal service uses to authenticate the indicium. The pseudo-random numbers are generated using a methodology by which the postal customer can generate pseudo-random numbers for units which have been purchased, but not for units which have not yet been purchased. Each indicium represents an amount of information which can be printed using a one-dimensional barcode, instead of two-dimensional barcodes required in other systems.

15 Claims, 6 Drawing Sheets

U.S. PATENT DOCUMENTS

| | | | | | |
|---|---|---|---|---|---|
| 4,649,266 | A | * | 3/1987 | Eckert | 235/432 |
| 4,725,718 | A | * | 2/1988 | Sansone et al. | 235/495 |
| 4,757,537 | A | * | 7/1988 | Edelmann et al. | 380/51 |
| 4,775,246 | A | * | 10/1988 | Edelmann et al. | 705/62 |
| 4,821,195 | A | * | 4/1989 | Baer et al. | 705/404 |
| 4,873,645 | A | * | 10/1989 | Hunter et al. | 700/231 |
| 4,934,846 | A | * | 6/1990 | Gilham | 400/104 |
| 5,189,700 | A | * | 2/1993 | Blandford | 713/178 |
| 5,289,542 | A | * | 2/1994 | Kessler | 380/257 |
| 5,319,562 | A | * | 6/1994 | Whitehouse | 705/403 |
| 5,341,425 | A | * | 8/1994 | Wasilewski et al. | 380/212 |
| 6,349,292 | B1 | * | 2/2002 | Sutherland et al. | 705/62 |

FOREIGN PATENT DOCUMENTS

| | | | | | |
|---|---|---|---|---|---|
| DE | 3915262 | A1 | | 11/1989 | |
| WO | WO 92/12485 | A1 | * | 7/1992 | G06F/12/14 |
| WO | WO 98/15085 | | | 4/1998 | |
| WO | WO 99/18543 | | | 4/1999 | |

OTHER PUBLICATIONS

Brakeman, Lynne. Proposed electronic postage metering system features 2D code. Automatic ID news; v13 n6, May 1997. Retrieved online 14mber 2002 [DIALOG].*

Blum et al., A Simple Unpredictable Pseudo–RandomNumber Generator, May, 1986, pp. 364–383.

* cited by examiner

SYSTEM AND METHOD FOR DISTRIBUTING POSTAGE OVER A PUBLIC NETWORK, ENABLING EFFICIENT PRINTING OF POSTAL INDICIA ON ITEMS TO BE MAILED AND AUTHENTICATING THE PRINTED INDICIA

CROSS REFERENCE TO RELATED APPLICATION

This application claims the priority of U.S. Provisional Patent Application Ser. No. 60/061,705, filed Oct. 6, 1997 entitled "UNIVERSAL POSTAL SYSTEM" and is a continuation of Ser. No. 09/167,393 filed Oct. 6, 1998 now U.S. Pat. No. 6,349,292.

FIELD OF THE INVENTION

The invention relates generally to the field of systems and methods for distributing postal indicia and more particularly to systems and methods for distributing postage over a public network in a manner that is secure in the case of third party interception, indicia which can be efficiently printed by a postal customer on items to be mailed, and a system that facilitates authentication of the printed indicia.

BACKGROUND OF THE INVENTION

There are several generally accepted systems for accounting for postage for items to be mailed with a postal delivery service such as the U.S. Postal Service. In one such system, the postal customer purchases postal stamps from the postal delivery service, which he or she affixes directly to each item to be mailed. When the postal delivery service receives the item, it will need to verify that the value of the stamp or stamps on the item is sufficient for the service. Postal delivery services such as the U.S. Postal Service currently use appearance-based mechanisms to verify that the stamps are authentic, and in addition to verify the value of the stamp(s) on the item and determine whether the value is sufficient. Generally, stamps must be purchased by the postal customer directly or indirectly from the postal delivery service and are considered primarily useful by low-volume customers.

Higher-volume postal customers typically use other postage accounting systems. In the other systems, most notably in metered systems, a postal customer makes use of a meter to apply postal "indicia" to respective items to be mailed, each indicium identifying the value of the postage applied thereto. Prior to using the meter, the postal customer purchases postage from the postal delivery service representing a bulk value which may be applied to item(s) to be mailed. As each postage indicium is applied by the meter to items to be mailed, the value of the postage represented by the indicium is deducted from the value remaining in the meter, which value can be replenished as necessary. As with the stamp-based system, postal delivery services such as the U.S. Postal Service, uses appearance-based mechanisms to verify that the indicium on each item to be mailed is authentic and to determine whether the value represented by the indicium is sufficient.

For some time, it has been acknowledged that current appearance-based mechanisms for verifying the authenticity and value represented by postal indicia are insufficient to protect postal revenue. To address that problem, the U.S. Postal Service has been developing a specification, called the Information Based Indicia Program ("IBIP"), which requires each indicium to include significantly more information to detail a postage transaction than is currently required, and to require that the information be cryptographically signed so that it cannot be altered. Although this system is secure, in order to accommodate the information required, each indicium must be printed using a dense, two-dimensional barcode. A number of problems arise in connection with use of a dense two-dimensional barcode such as would be required by the IBIP. First, since the barcode is quite dense, errors can develop during scanning, particularly in connection with items which are creased or soiled. In addition, since the barcode contains a large amount of information, the time required to process the information related to each item can be significant, which can result in delays.

A further problem arises in connection with the IBIP. The IBIP contemplates that postage purchased by a postal customer be maintained in a secure special-purpose hardware device termed a Postal Security Device ("PSD"). The PSD maintains the security of the information which would be used in connection with the indicia required for the IBIP, most notably the value of the postage purchased by the postal customer. The PSD can enable any printer that meets the image specifications which are required of the indicia by the IBIP to print the indicia, so that the postal customer can move from one printer to another to print indicia merely by disconnecting the PSD from the one printer and connecting it to the other. While this flexibility is advantageous, it does require rental or purchase of the PSD.

SUMMARY OF THE INVENTION

The invention provides a new and improved system and method for distributing postage over a public network in a manner that is secure in the case of third party interception, indicia which can be efficiently printed by a postal customer on items to be mailed, and a system that facilitates authentication of the printed indicia.

In brief summary, the invention provides a system for distributing postage over a public network in a manner that is secure in the case of third party interception, indicia which can be efficiently printed by a postal customer on items to be mailed, and a system that facilitates authentication of the printed indicia. When the postal customer purchases postage from the postal service, the postal service provides information which the postal customer uses to generate pseudo-random numbers associated with the respective units of postage. When the postal customer prints an indicium for a respective unit, it appends the associated pseudo-random number, which the postal service uses to authenticate the indicium. The pseudo-random numbers are generated using a methodology by which the postal customer can generate pseudo-random numbers for units which have been purchased, but not for units which have not yet been purchased. Each indicium represents an amount of information which can be printed using a one-dimensional barcode, instead of two-dimensional barcodes required in other systems. The postal service maintains a running record of the units of postage which have been used by the postal customer, and so the postal customer cannot use a unit for more than one indicium. Thus, devices such as the postal security device ("PSD") are not needed by the postal customer, which provides for enhanced flexibility in printing the indicia.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
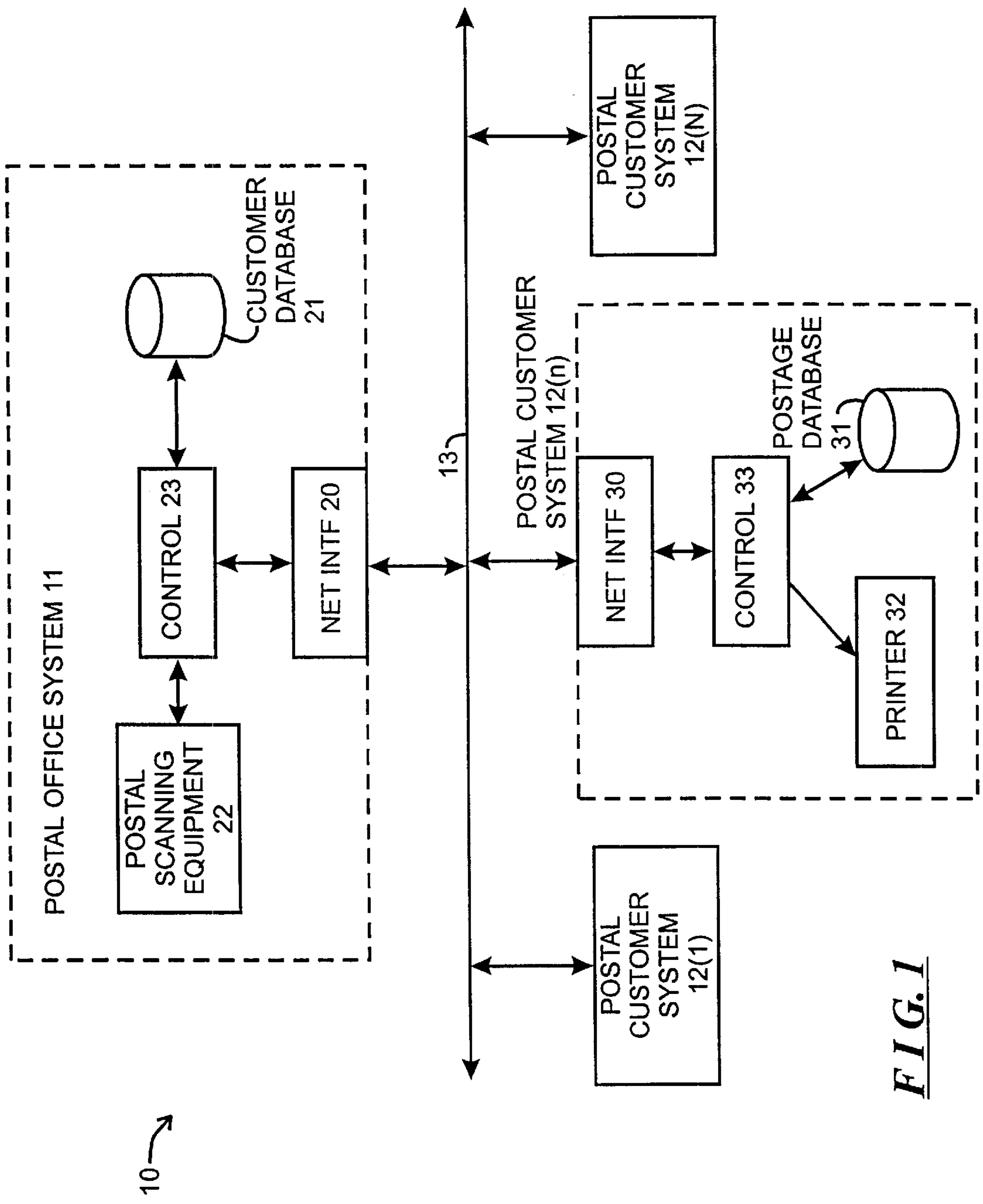
FIG. 1 is a functional block diagram of a postal system constructed in accordance with the invention.

FIG. 1 is a functional block diagram of a postal system 10 constructed in accordance with the invention. With reference to FIG. 1, postal system 10 includes a postal office system 11, and one or more postal customer systems 12(1) through 12(N) (generally identified by reference numeral 12(*n*)). The postal office system 11 is maintained by a postal delivery service, such as the U.S. Postal Service. Each of the postal customer systems 12(*n*) is used by a postal customer, in particular, someone who will wish to avail him- or herself of postal delivery and other services provided by the postal delivery services. Each postal customer system 12(*n*) can connect to the postal office system 11 over a communication link 13, which may include, for example, one or more public networks such as the Internet, private networks, the public telephony system, or the like, or any combination thereof, to facilitate transfer of information, as described below, between the respective postal customer system 12(*n*) and the postal office system 11.

In particular, each postal customer system 12(*n*) can engage in an information transfer over the communication link 13 to facilitate the purchase by the respective postal customer system 12(*n*) of postage in bulk from the postal office system 11. The purchase of postage essentially authorizes the respective postal customer system 12(*n*) to print postal indicia on items to be mailed representing postage of a value represented by the indicia, which the postal delivery service will honor when it receives the respective items. Thus, after a postal customer system 12(*n*) purchases postage from the postal office system 11, it (that is, the postal customer system 12(*n*)) is permitted to print authentic postage indicia on items to be mailed using the postal delivery service, after which the respective postal customer can provide the respective items to the postal delivery service for mailing. The postal office system 11, after being provided with an item to be mailed by a postal customer, can scan the postage indicium printed thereon by the customer's postal customer system 12(*n*) to verify its authenticity and that the postage represented thereby is sufficient for the class of service to be provided in connection therewith. Operations performed by the postal office system 11 and a postal customer system 12(*n*) will be described in detail below.

More specifically, and with continued reference to FIG. 1, the postal office system 11 includes a number of elements, including one or more network interfaces 20, a customer database 21, and postal scanning equipment 22, all connected to and controlled by a control module 23. The postal scanning equipment 22 is provided to scan, inter alia, postage indicia on items that are provided by the postal customers to be mailed and to communicate with the control module 23 to facilitate the verification of authenticity of the scanned postal indicia and the sufficiency of the amount of postage represented by the scanned postal indicia for the service to be provided. Generally, the postal scanning equipment 22 may comprise individual scanners (not separately shown) which are distributed among a number of postal offices at which mailed items are received by the postal delivery service from postal customers. On the other hand, the other elements of the postal office system 11, in particular the control module 23, customer database 21 and network interface(s) 20, may be located remote therefrom at a centralized location to which all of the scanners may connect over, for example, a network.

The network interface(s) 20, customer database 21 and control module 23 may be in the form of a digital computer system or a plurality of computer systems, which may be interconnected, which facilitate the purchase by postal customers of postage. Each computer system will typically be in the form of a server computer including a processor module, and may also include operator interface elements comprising operator input components such as a keyboard and/or a mouse and an operator output element such as a video display device. The server computer is generally of the conventional stored-program computer architecture. The processor module includes, for example, processor, memory and mass storage devices such as disk and/or tape storage elements, which perform processing and storage operations in connection with digital data provided thereto. The operator input elements permit an operator to input information for processing. The video display device is provided to display output information generated by the processor module on a screen to the operator, including data that the operator may input for processing, information that the operator may input to control processing, as well as information generated during processing. The processor module generates information for display by the video display device using a so-called "graphical user interface" ("GUI"), in which information for various applications programs is displayed using various "windows". Although the computer is indicated as comprising particular components, such as the keyboard and mouse for receiving input information from an operator, and a video display device for displaying output information to the operator, it will be appreciated that the computer may include a variety of components in addition to or instead of those described above. In addition, the processor module includes one or more network ports, which are connected to communication links which connect the computer to the communication link 13.

More specifically, the network interface(s) 20, which include the network ports described above, connect to the communication link 13 and facilitate communications with the postal customer systems 12(*n*) to enable them (that is, the postal customer systems 12(*n*)) to purchase postage from the postal delivery system. The respective network interface(s) 20 receive messages transmitted by the postal customer systems 12(*n*) over the communication link 13 and extracts the information contained therein for provision to the control module 23. In addition, the respective network interface(s) 20 receives information from the control module 23 for transmission to respective postal customer systems 12(*n*), formats the information into messages and transmits the messages over the communication link 13 to the respective postal customer systems 12(*n*). The messages may have any convenient format or structure, and may be transferred over the communication link 13 in accordance with any convenient information transfer protocol.

The customer database 21, which forms part of the mass storage devices described above, stores information, as will be described below, regarding the postal customers, including customer account identifiers for the respective postal customers and the amounts of postage purchased thereby. In addition, the customer database 21 stores information as to the particular units (such as pennies) of postage, from the postage which has been purchased, which have been utilized by the postal customers, as indicated by the postal indicia scanned by the postal scanning equipment, and thus also identifies the particular units which are available for usage, thereby to facilitate detection if the postal customer attempts to use the same unit of postage twice. Furthermore, the customer database 21 stores information for the respective postal customers, which will be described below in detail, which is used in verifying the authenticity of postage indicia which has been scanned by the postal scanning equipment.

The control module 23, which includes the processing devices described above, performs a number of functions. In particular, in connection with the purchase of postage by a postal customer, it receives information from the network interface(s) 20 representing purchase requests, determines whether the purchase is to be permitted, and generates information, described below, responsive to the request. If the request is from a new customer, the control module 23 can initiate establishment of a new account for the postal customer. If a postage purchase is to be permitted, the control module 23 generates information, which is provided to the network interface(s) 20 for transfer to the respective postal customer indicating the units of postage purchased, along with other information as described below which the customer uses in printing indicia which is useful in authenticating the indicia when scanned by the postal scanning equipment 22. In addition, the control module 23 enables the storage of information in the customer database 21 as to the units of postage purchased and the running total for the amount of postage purchased by the particular postal customer. In addition, the control module 23 may store information in the customer database 21 which is useful in authenticating indicia scanned by the postal scanning equipment 22.

In connection with indicia scanned by the postal scanning equipment, the control module 23 receives information from the indicia scanned by the postal scanning equipment, as will be described below in detail, authenticates the indicia and verifies that the units of postage as represented by the indicia are appropriate for the service to be provided and that the units are available in the postal customers' accounts as indicated in the customer database. Depending on the results of the authentication and verification for each item whose indicia was scanned, the control module 23 may allow or deny provision of the service. In addition, if the service is to be provided for a particular item, the control module 23 will mark the units of postage as represented by the indicia as "used" in the customer database 21.

The postal customer systems 12(*n*) may be generally similar to each other. Each postal customer system includes a network interface 30, postage database 31, and printer 32 all under the control of a control module 33. The network interface 30, postage database 31 and control module 33 will typically be in the form of a personal computer, computer workstation or the like, which may be generally similar to the computer system used in connection with the postal office system 11, including a processor module and operator interface elements comprising operator input components such as a keyboard and/or a mouse and an operator output element such as a video display device. The postal customer systems 12(*n*) includes printer 32 to print postage indicia for use on items to be mailed.

More specifically, the network interface 30 connects to the communication link 13 and facilitate communications with the postal office system 11 to enable the purchase of postage from the postal delivery system. The network interface 30 receives messages transmitted by the postal office system 11 over the communication link 13 and extracts the information contained therein for provision to the control module 33. In addition, the network interface 30 receives information from the control module 33 for transmission to the respective postal office system 11, formats the information into messages and transmits the messages over the communication link 13 to the postal office system 11. The messages may have any convenient format or structure, and may be transferred over the communication link 13 in accordance with any convenient information transfer protocol.

The postage database 31, as will be described below in greater detail, stores the customer account identifier for the postal customers which maintains the postal customer system 12(*n*) as well as the amounts of postage purchased thereby. In addition, the postage database 31 stores information as to the particular units of postage, from the postage which has been purchased, which can be utilized by the postal customer for printing in postal indicia by printer 32. Furthermore, the postage database 31 stores information, which will be described below in detail, which is used in printing in postal indicia, which will be used by the postal office system 11 to verify the authenticity of postage indicia printed by the postal customer system 12(*n*).

The control module 33 performs a number of functions. In particular, in connection with the purchase of postage from the postal office system 11, it provides information to the network interface 30 representing purchase requests, and receives information from the network interface 30 responsive thereto. As noted above, in response to a postage purchase request, the postal office system can provide information as to the units of postage which have been purchased, as well as other information which the postal customer system 12(*n*) will use in printing indicia, which other information, when used in connection with printing of indicia, is used by the postal office system 11 to authenticate the indicia. The control module 33 can enable all of the information to be stored in the postage database 31. In connection with an indicium printed by the printer 32, the control module 33 determines the amount of postage to be represented by the indicium and retrieves information from the postage database 31 representative thereof, along with the authentication information, and enables the printer 32 to print that information, along with other information described below, on the indicium.

In accordance with the invention, each postal indicium that the printer 32 prints on items to be mailed is represented by a barcode or other conveniently-scanned construct having a plurality of concatenated fields of the form

<CUST_ID|SERV_CLASS|POST_AMT|TOT_POST|P_RAND_NO> in which (i) the CUST_ID customer identifier field contains a postal customer identifier value identifying the postal customer whose system 12(*n*) printed the indicia, (ii) the SERV_CLASS service class field contains a postal rate class or service level identifier value that is to be used in connection with delivery of the item by the postal delivery service, (iii) the POST_AMT postage amount field contains a postage amount value identifying the amount of postage that is represented by the indicium, (iv) the TOT_POST total postage field contains a value identifying a running total amount of postage used by the postal customer including the postage contained in the POST_AMT field, (v) the P_RAND_NO pseudo-random number field contains a pseudo-random number generated as described below, and (vi) the "|" represents the concatenation operation.

In one embodiment, the postage amount value contained in the POST_AMT is represented in pennies. In that embodiment, the sizes of the fields described above are (i) for the CUST_ID customer identifier field, on the order of twenty-five binary digits ("bits"), allowing a maximum of on the order of thirty-two million ($2^{25}$) postal customers, (ii) for the SERV_CLASS service class field, on the order of four bits, allowing a maximum of on the order of sixteen ($2^4$) different postal rate classes or service levels, (iii) for the POST_AMT postage amount field, on the order of twenty bits, allowing a maximum of on the order of $10,000.00 worth of postage ($2^{20}$ pennies), (iv) for the TOT_POST total postage field, on the order of twenty-eight bits, allowing a maximum of on the order of $2.6 million dollars of total postage for a particular postal customer as identified by the postal customer identifier value contained in the CUST_ID field, and (v) for the P_RAND_NO pseudo-random number field, on the order often bits, which would comprise, for example, the low-order ten bits of the pseudo-random number generated as described below, for on the order of eighty-seven bits to be represented by the indicium. It will be appreciated that an indicium of eighty-seven bits can be represented by a one-dimensional barcode, thereby avoiding any necessity of providing a two-dimensional representation as required by the U.S. Postal Service's IBIP.

The postal customer identifier value to be used in the CUST_ID field is assigned to a postal customer by the postal delivery service, in particular by the postal office system II (FIG. 1). The postal office system 11 may assign a postal customer identifier value to a particular postal customer when the postal customer initially opens an account with the postal delivery service through which it (that is, the postal customer) will purchase postage from the postal office system 11. In addition, the postal office system 11 may assign a new postal customer identifier value to the postal customer when the postal customer wishes to purchase postage which would make the running total amount of postage exceed the maximum value allowed by the TOT_POST total postage field of the indicium. A postal customer, using his or her postal customer system(s) 12(*n*), can purchase postage from the postal office system 11 in a series of postage purchase sessions $S_1$, $S_2$, . . . , SK (generally "$S_k$"), in each session the postal customer purchasing a block of postage that can be used in connection with one or more indicia. For example, if, in a session $S_k$ in which the postal customer wishes to purchase "$M_k$" pennies worth of postage, he or she has previously purchased a total of "$B_k$" pennies worth of postage, he or she will be able to purchase the postage using his or her current postal customer identifier value if the sum $B'_k=B_kM_4$ does not exceed the maximum value allowed by the TOT_POST total postage field. If the sum $B'_k$ would exceed the maximum value, allowed by the TOT_POST total postage field, then the postal office system 11 can assign the postal customer a new postal customer identifier value. It will be appreciated that:

(a) the sum $B'_k$ for one session will be used as $B_k$+l for the next session $S_{k+1}$, and (b) the amounts $M_k$ which may be purchased during the various sessions $S_k$ may differ as among the respective sessions $S_k$.

As noted above, the TOT_POST total postage field of a postage indicium applied to an item to be mailed contains a value that identifies a running total amount of postage used by the postal customer including the postage contained in the POST_AMT field. Thus, if the postal customer system 12(*n*) has previously printed indicia for items to be mailed which total "b" pennies worth of postage, and if the amount of postage to be used in connection with the item to be mailed is "m" pennies (in which case the value "m" would be printed in the indicium in the POST_AMT postage amount field), then the value b'=b+m would be printed in the TOT_POST total postage field of the indicium. It will be appreciated that:

(a) the sum b' for one indicium will be used as "b" for the next indicium, and (b) the amounts "m" which may be used as among the various indicia may differ as among the respective indicia, to correspond to the number of pennies of postage to be applied to the respective items with which the respective indicia are to be used.

As farther noted above, each indicium printed by a postal customer system 12(*n*) includes a P_RAND_NO pseudo-random number field that contains a pseudo-random number. The pseudo-random number that is used in connection with an indicium is selected from a sequence of pseudo-random numbers $$\{R_i\}_{i=1}^{\infty}$$

that can be generated by the postal customer system 12(*n*) from information provided by the postal office system 11 when the postal customer system 12(*n*) purchases postage from the postal office system 11. In particular, suppose that during a session $S_k$ the postal customer system 12(*n*) purchases "$M_k$" pennies and that he or she has previously purchased a total "$B_k$" pennies worth of postage. Then the pennies that the postal customer purchases during that session $S_k$ can be identified by the sequence of indicies $B_k+1, \ldots, B_k+M_k$. By purchasing these pennies of postage, the postal office system 11 provides the postal customer system 12(*n*) with information that enables the postal customer system 12(*n*) to efficiently compute elements $R_{B_k+1}, \ldots, R_{B_k+M_k}$ of the pseudo-random number sequence $$\{R_i\}_{i=1}^{\infty}.$$

When an indicium is printed for which the TOT_POST total postage field contains the value b', representing the value b+m, where "m" is the amount of postage to be used in connection with the item to be mailed, and "b" is the total amount of postage of all previously printed indicia, then the value of the element "$R_{b'}$," from the pseudo-random number sequence will be used in connection with the indicium.

It will be appreciated that, since the postal office system 11 provides the information from which the postal customer system 12(*n*) generated the pseudo-random number sequence, the postal office system 11 can generate the same pseudo-random number sequence and, after scanning an indicium, authenticate the indicium from the contents of the CUST_ID customer identifier, TOT_POST total postage and P_RAND_NO pseudo-random number fields. That is, if the postal office system 11 determines that the contents of the P_RAND_NO pseudo-random number field contains a value which corresponds to element "$R_T$" of the pseudo-random number sequence as determined by the values in the CUST__ID customer identifier field and the T=TOT__POST total postage field, then it (that is, the postal office system 11) can determine with a high degree of probability that the indicium is authentic. On the other hand, if the postal office system 11 determines that the contents of the P__RAND__NO pseudo-random number field contains a value which does not correspond to element "$R_T$" of the pseudo-random number sequence as determined by the values in the CUST__ID customer identifier field and the T=TOT__POST total postage field, then it (that is, the postal office system 11) can determine with certainty that the indicium is not authentic. If the postal office system 11 determines that the indicium is authentic, the postal delivery service can proceed with delivery of the item, but, if it (that is, the postal office system 11) determines that the indicium is not authentic, the postal delivery service can perform predetermined corrective actions. If the postal office system 11 determines that the indicium is authentic, it (that is, the postal office system 11) can additionally note in the customer database 21 that pennies b+1 through b'=b+m have been used where "b'" is the total amount of postage TOT__POST of all printed indicia and "m" is the amount of postage POST__AMT used in connection with the item that has been mailed, so that, if an indicium is later scanned in which the POST__AMT postage amount and TOT__POST total postage fields identify a penny which has been previously used, it can also perform predetermined corrective actions.

The postal customer systems 12(*n*) and postal office system 11 generate the pseudo-random number sequence using a selected methodology, the methodology preferably having properties described as follows. Given functions $G_s$, $F_s$, CK and PK such that $G_s$: $Z^+ \rightarrow \{0,1\}^u$ (that is, a "u" bit binary integer), $F_s$: $Z \rightarrow \{0,1\}^v$ (a "v" bit binary integer), CK: $\{0,1\}^w \rightarrow \{0,1\}^c$ (a function from a "w" bit binary integer to a "c" bit binary integer) and PK: $\{0,1\}^w \rightarrow \{0,1\}^d$ (a function from a "w" bit binary integer to a "d" bit binary integer), and $s \in \{0,1\}^w$ (an element of the set of "w" bit binary integers), such that:

(i) with knowledge of "i", $G_s(i)$ and CK(s), it is mathematically "easy" to compute $F_s(j)$ for $i-h \leqq j \leqq i$, where "h" is at most polynomial in "u".

(ii) with knowledge of "i" and $G_s(i)$ for $i \in \{i_1, i_2, \ldots, i_h\}$, where "h" is at most polynomial in "u", and without knowledge of CK(s) (contrast property (i) above), it is mathematically "hard" to compute $F_s(j)$ for $j \notin \{i_1, i_2, \ldots, i_h\}$, (iii) with knowledge of "i", $G_s(i)$ and PK(s), it is mathematically "easy" to compute $G_s(j)$ and $F_s(j)$ for all values of "j", and (iv) with knowledge of "i" and $G_s(i)$ for $i \in \{i_1, i_2, \ldots, i_h\}$, where "h" is at most polynomial in "u" and with knowledge of CK(s), but without knowledge of PK(s) (contrast properties (i) and (iii) above), it is mathematically "hard" to compute $F_s(j)$ for $j > \max(i_1, i_2, \ldots, i_h)$ where max is the maximum value taken over the set of $i_k$'s where "i" and "j" are indices representing respective "$i^{th}$" and "$j_{th}$" pennies of postage. In items (i) through (iv) above, (a) $G_s$ represents the elements of a sequence used to derive the pseudo-random values; one of the elements of the sequence, namely, $G_s(B')$, will be provided by the postal office system 11 to the postal customer system 12(*n*) during each postage purchase session, and the postal customer system 12(*n*) can generate values for the other elements as necessary for use in connection with the P__RAND__NO pseudo-random number field of each indicium;

(b) F represents the pseudo-random values derived from the elements $G_s$ that the postal customer (in particular the postal customer system 12(*n*)) will use in the P__RAND__NO pseudo-random number field; in one embodiment, the value $F_s$ corresponds to a predetermined number of low-order bits of the respective element $G_s$;

(c) CK represents one or more values which are useful by the postal customer system 12(*n*) in generating values for the elements of the pseudo-random sequence $F_s(B'')$, where $B'' \leqq B'$ and $G_s(B')$ has been provided to the postal customer system 12(*n*) by the postal office sytem 11; and (d) PK represents one or more values which are useful by the postal office system 11 in efficiently generating values for elements of the sequence $G_s(B'')$, where B" represents any position in the sequence that needs to be computed by the postal office system 11.

By the first property (property (i) above), the postal customer system 12(*n*) will be able to generate the pseudo-random number sequence for the pennies which have been purchased, and only for those pennies purchased. Consequently, the postal customer system 11 will not need to download every value of the pseudo-random number sequence. When, during a postage purchase session, a postal customer purchases "M" pennies worth of postage, the postal office system 11 will provide him or her with a value for $G_s(B')$, where, as above, B'=B+M, where "B" was the total amount of postage purchased up to the previous postage purchase session. From the first property, the postal customer (more specifically the postal customer system 12(*n*)) will be able to easily calculate the pseudo-random number sequence $F_s(B'')$ for all pennies of postage $B'' \leqq B'$ which he or she has purchased.

On the other hand, by the fourth property (property (iv) above), the postal customer will not be able to generate any elements of the random number sequence $F_s(B'+1)$, $F_s(B'+2)$, . . . , in which case it is extremely unlikely (within a probability determined by the number of bits used for the P__RAND__NO pseudo-random number field of the indicium) that the postal customer system 12(*n*) will be able to generate a correct pseudo-random number value for postage using pennies above the running total B' which he or she has previously purchased.

Property (ii) is slightly more restrictive than may be needed in connection with system 10. Generally, for system 10 it is sufficient that (ii') with knowledge of "i" and $F_s(i)$ for $i \in \{i_1, i_2, \ldots, i_h\}$, where "h" is at most polynomial in "u", and without knowledge of CK(s) (contrast property (i) above), it is mathematically "hard" to compute $F_s(j)$ for $j \notin \{i_1, i_2, \ldots, i_h\}$ Because of property (ii') if a third party were to intercept the value for a polynomial number of indicia printed by the postal customer, the third party would be unable to generate an value of the postal customer's pseudo-random number sequence. For this particular implementation it is necessary that the value $G_s(i)$ transmitted by the postal office system 11 to the postal customer system 12(*n*) over communication link 13 during a postage purchase session must be transmitted in a secure manner. This can be accomplished by using any standard secure communications protocol such as, for example, the Secure Sockets Layer protocol (SSL). Finally, according to the third property (property (iii) above), the postal office system 11 will be able to efficiently generate a a value for $G_s(i)$ and $F_s(i)$ for any "s" and "i" that are potentially used in the system, in which case the postal office system will be able to efficiently issue any amount of postage to the postal customer system 12(*n*) and will be able to efficiently verify any pseudo-random value P__RAND__NO appearing in an indicium.

A suitable pseudo-random number sequence generation methodology for use in connection with the system 10 is that described in L. Blum, et al., "A Simple Unpredictable Pseudo-Random Number Generator", SIAM Journal on Computing, Vol., 15, No. 2 (1986) pp. 364–383, and particularly the methodology referred to therein as an "$x^2$ mod N generator" (hereinafter referred to as the "BBS generation methodology"). In the BBS generation methodology, if (i) two, k-bit prime numbers "p" and "q", both of which are congruent to "3 mod 4" (where "mod" refers to the modulo function) are selected, and "n" is their multiplicative product (that is, "n=pq"), and (ii) a random number "x" is selected which is coprime with "n", such that $x_0=x^2$ mod n, where "$x_0$" is any selected value, which is also referred to as the "seed" for the BBS generation methodology, (iii) a sequence is defined according to $$x_i = x_{i-1}^2 \bmod n. \tag{1}$$

By the way that values for "p" and "q" have been selected, the sequence defined by equation (1) can be generated in the reverse direction, starting with $x_i=x_0$. In particular, there is exactly one square root of $x_i$ which is a quadratic residue (that is, that satisfies the equation $x_i=x_{i-1}{}^2$ mod n), which square root is the value for $x_{i-1}$. A methodology for efficiently generating the sequence in the reverse direction, which requires knowledge of the values for "p" and "q", will be described below.

Given the sequence defined by equation (1), the elements of the BBS pseudo-random number sequence $b_0, b_1, \ldots, b_i, \ldots$ used in the postage indicia each correspond to the "r" least significant bits of the respective $x_0, x_{-1}, \ldots, x_{-i}, \ldots$. It has been shown in U. V. Vazirani, et al., "Efficient and Secure Pseudo-Random Number Generation", Advances in Cryptology: Proceedings of Crypto '84, Springer-Verlag, 1985, pp.193–202 that if $r \leqq \log_2(\log_2 n)$ then the elements $b_i$ of the sequence can be determined with better than uniform probability over values in the range from "0" to "$2^r-1$" only if an unreasonably large amount of computation is used. As a result, the probability of successfully predicting the value of any element $b_i$ of the sequence will be extremely close to $\frac{1}{2}^r$. With knowledge of values for "p" and "q", the BBS methodology facilitates generation of a pseudo-random number sequence in which the "$i^{th}$" element of the sequence corresponds to $b_i$. With knowledge of values for "n" and $x_{-i}$, the pseudo-random number sequence $b_j$ can be readily generated for $j \leqq i$, but it is not possible to compute any elements of the sequence $b_j$ for j>i.

With this description of the BBS methodology, the functions "$G_s$", "$F_s$" "CK", "PK" and "s" correspond to the above-described functions used in the BBS methodology as follows:

(i) $s=\langle n|x_0\rangle$;

(ii) CK: $\{0,1\}^{2 \log n} \rightarrow \{0,1\}^{\log n}$ is defined by $CK(s)=\langle n\rangle$;

(iii) PK: $\{0,1\}^{2 \log n} \rightarrow \{0,1\}^{2 \log n}$ is defined by $PK(s)=\langle p|q|x_0\rangle$;

(iv) $G_s$: $Z^+ \rightarrow (Z_n{}^*)^2$ is defined by $G_s(i)=x_{-i}$; and (v) $F_s$: $Z^+ \rightarrow \{0,1\}^r$ is defined by the "r" least significant bits of $G_s(i)$, where, as above, the vertical bar "|" represents the concatenation operation. Thus, from item (ii) directly above and equation (1), since the postal office system 11 provides the postal customer system 12(*n*) with the values for "n" and "$x_{-i}$" for some i, the postal customer system 12(*n*) will be able to generate the elements of the sequence $G_s(j)$ for $j \leqq i$ and the pseudo-random number values $F_s(j)$ for $j \leqq i$ for insertion into the appropriate indicia. On the other hand, the postal office system 11 does not provide the postal customer system 12(*n*) with values for "p" and "q", which would be useful in generating elements of the sequence $G_s(j)$ for j>i, as will be seen below.

As noted above, a method exists for efficiently generating values for $x_{-1}, x_{-2}, \ldots, x_{-i}$, from $x_0$ given the values for $x_0$, "p" and "q". The method particularly facilitates the generation of a value for $x_{-i}$ for any "i", using the values for $x_0$, "p" and "q" without the necessity of generating the intermediate values $x_{-i}, \ldots, x_{-i+1}$. It will be appreciated that, since the postal office system 11 generates the values for "p" and "q" as elements of PK (item (iii) directly above) the postal office system 11 would make use of this method when determining whether the scanned postal indicia are authentic; on the other hand, since the postal office system 11 does not provide the values for "p" and "q" to the postal customer system 12(*n*) (reference item (ii) directly above), the postal customer system would not make use of this method when generating the postal indicia. The efficient methodology makes use of the Chinese Remainder Theorem and the Euclidean algorithm for determinating values for the greatest common divisor ("gcd") of two numbers. According to the Chinese Remainder Theorem, a system of equations $$\begin{aligned} x &= a_1 (\text{mod } m_1) \\ x &= a_2 (\text{mod } m_2) \\ &\vdots \\ x &= a_k (\text{mod } m_k) \end{aligned}, \tag{2}$$

(where values for $a_1, a_2, \ldots, a_k$ and $m_1, m_2, \ldots, m_k$ are known) always has a solution for "x", if the moduli $m_1, m_2, \ldots, m_k$ are relatively prime in pairs. In addition, the solution "x" is unique "mod m", where "m" is the multiplicative product of $m_1, m_2, \ldots$, and $m_k$. Several methodologies are known for determining the value for "x" in equation (2).

According to the Euclidean algorithm, the gcd of two numbers "a" and "b" can be expressed as a linear combination of "a" and "b", that is, gcd=ua+vb, where "u" and "v" are integers. The Euclidean algorithm provides a straightforward methodology for determining values for "u" and "v". In this case, "a" corresponds to "p" and "b" corresponds to "q", in which case 1=up+vq, so that, using the Euclidean algorithm it is straight-forward to generate values for "u" and "v".

The unique quadratic residue "$x_{-1p}$ mod p" whose square has the value "$x_0$ mod p" (reference equation (1)) corresponds to the value $$x_0^{(p+1)/4 mod (p-1)}$$

mod p, and the unique quadratic residue "$X_{-1q}$ mod q" whose square is "$x_0$ mod q" (reference equation (1)) corresponds to the value $$x_0^{(q+1)/4 mod(q-1)}$$

mod q. From the Euclidean algorithm, values for "u" and "v" can be readily determined such that 1=up+vq, which are used to combine the values for $x_{-1p}$ and $x_{-1q}$ to generate $x_{-1}$ as $$x_{-1}=qvx_{-1p}+pux_{-1q} mod\ n \quad (3).$$

By the Chinese Remainder Theorem (reference equation (2)), $x_{-1}$ is the unique integer mod n whose square is $x_0$ mod n. More generally, the unique quadratic residue "$x_{-ip}$ mod p" which, when squared "i" times, is "$x_0$ mod p" corresponds to the value $$x_0^{\left[\frac{(p+1)}{4}\right]^i \bmod (p-1)} \bmod p. \quad (4)$$

Similarly, the unique quadratic residue "$x_{-iq}$ mod q" which, when squared "i" times, is "$x_0$ mod q" is $$x_0^{\left[\frac{(q+1)}{4}\right]^i \bmod (q-1)} \bmod q. \quad (5)$$

From the Euclidean algorithm, values for "u" and "v" can be readily determined such that 1=up+vq, which are used to combine the values for $x_{-ip}$ and $x_{-iq}$ to generate $x_{-i}$ as $$x_{-i}=qvx_{-ip}+pux_{-iq} mod\ n \quad (6).$$

Thus, using equations (4) through (6) and the Euclidean algorithm, the value for $x_{-i}$ can be generated directly for any "i" without any need for generating the intermediate values between $x_0$ and $x_{-i}$.

Figure 2:
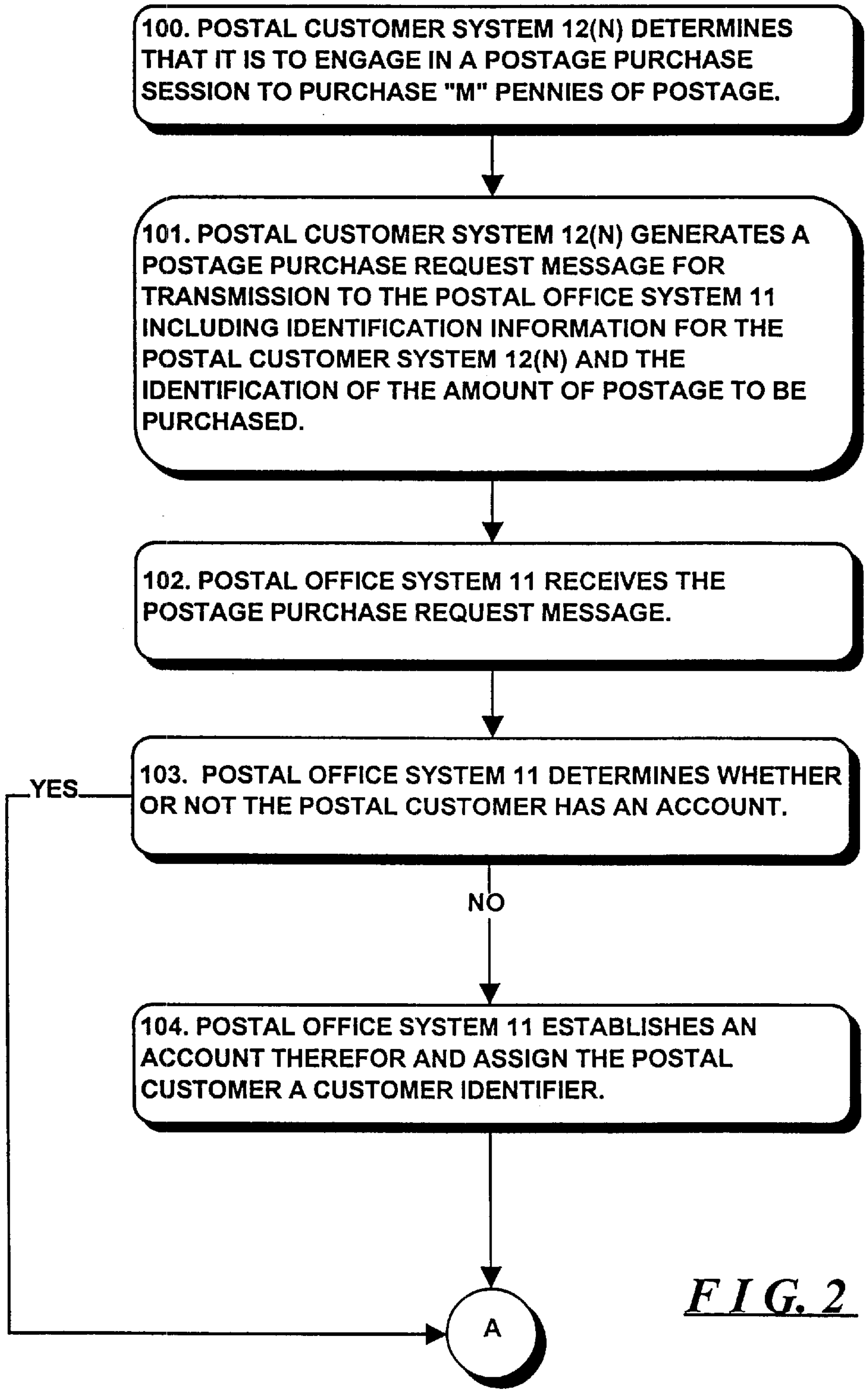
FIGS. 2 through 4 are flowcharts depicting operations performed by the postal system in accordance with the invention.
Figure 2A:
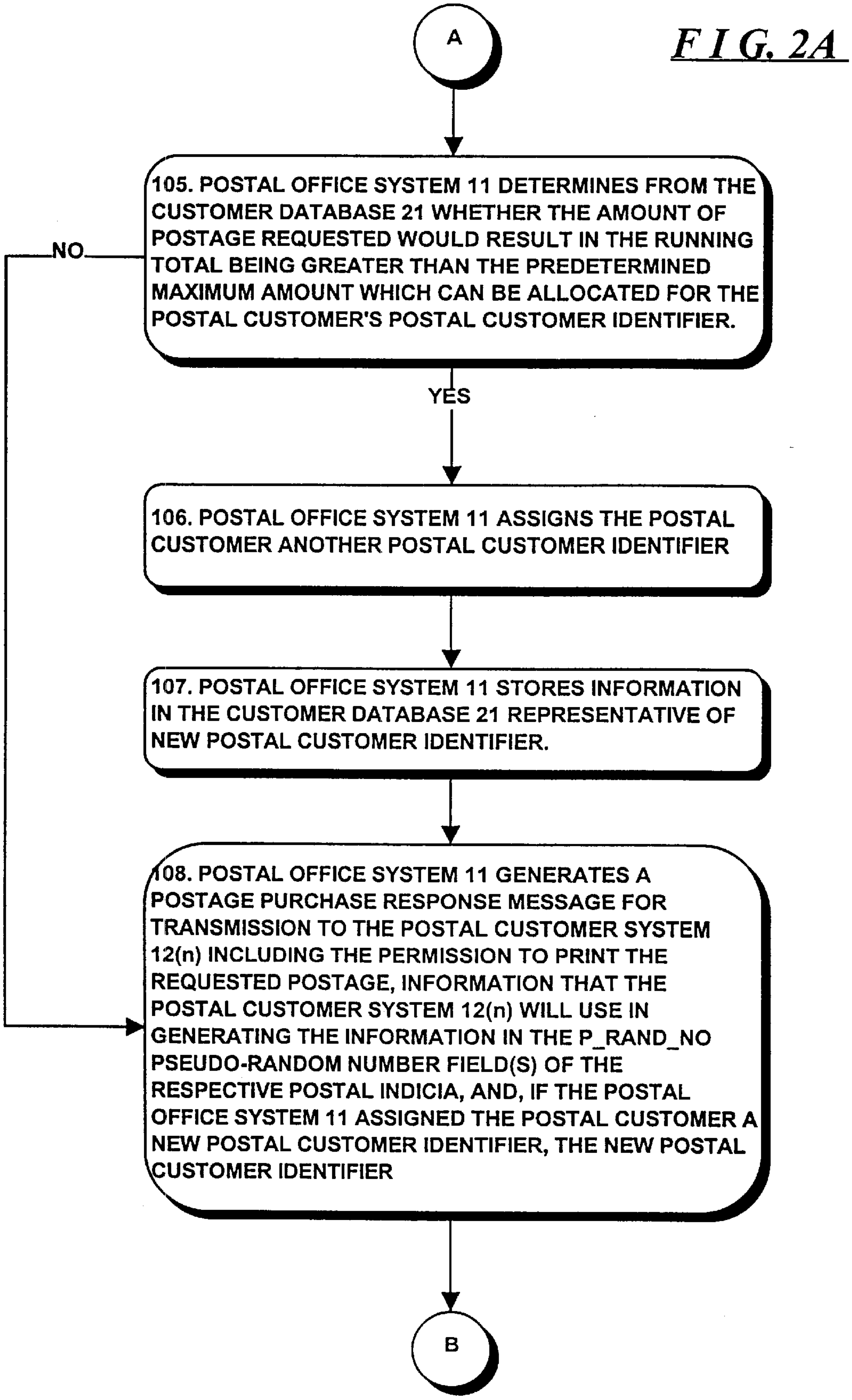
Figure 2B:
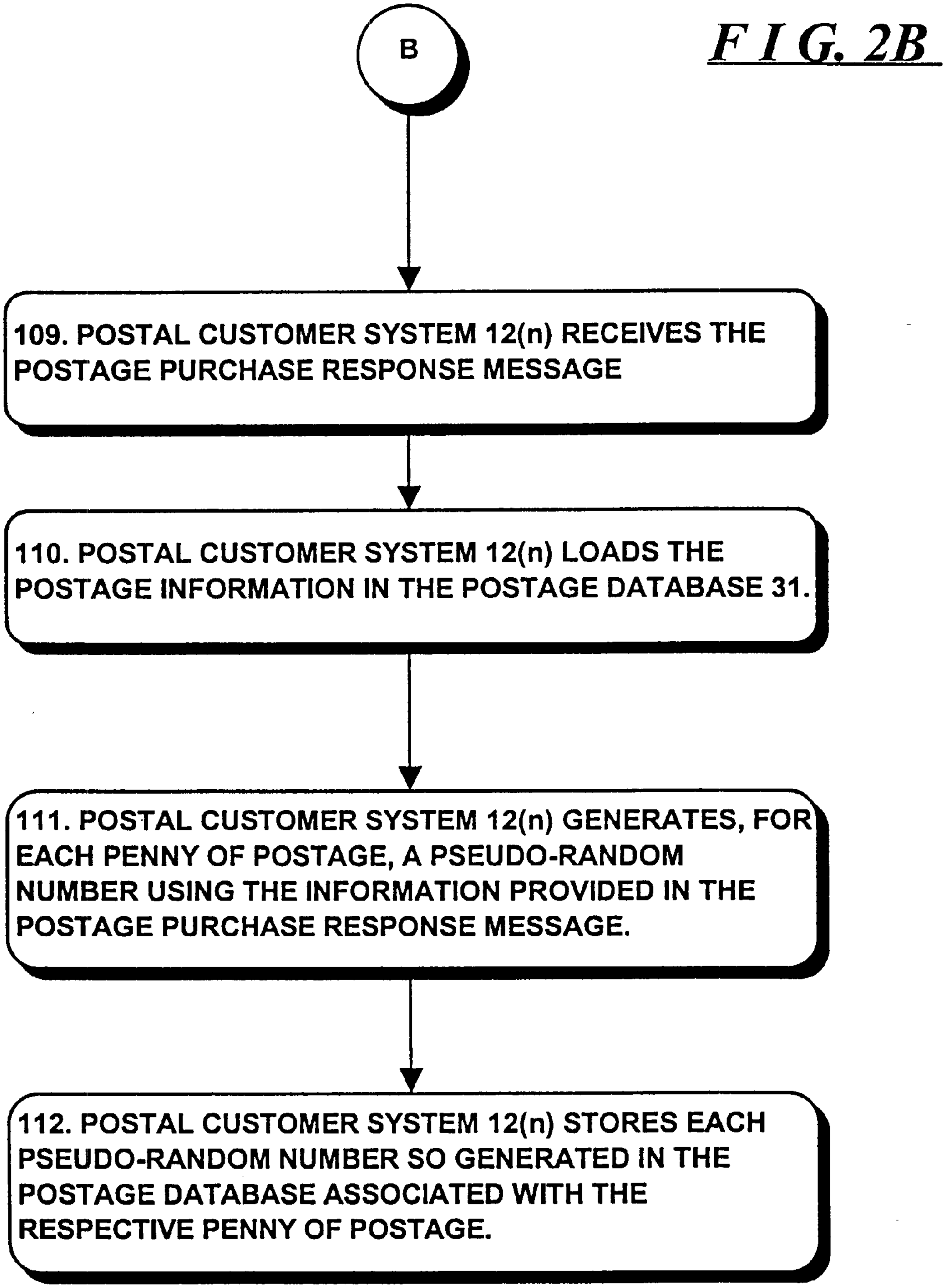
Figure 3:
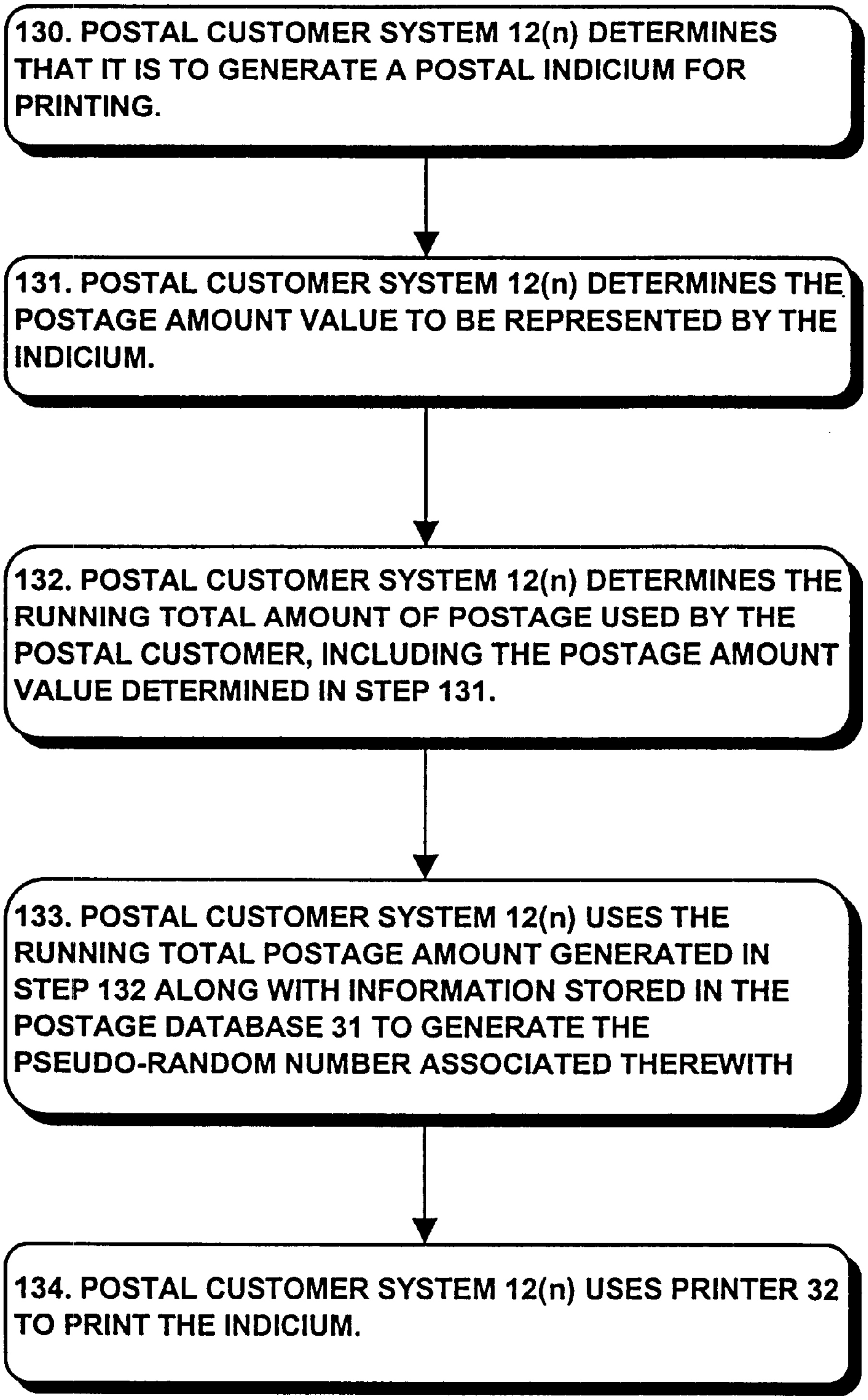
Figure 4:
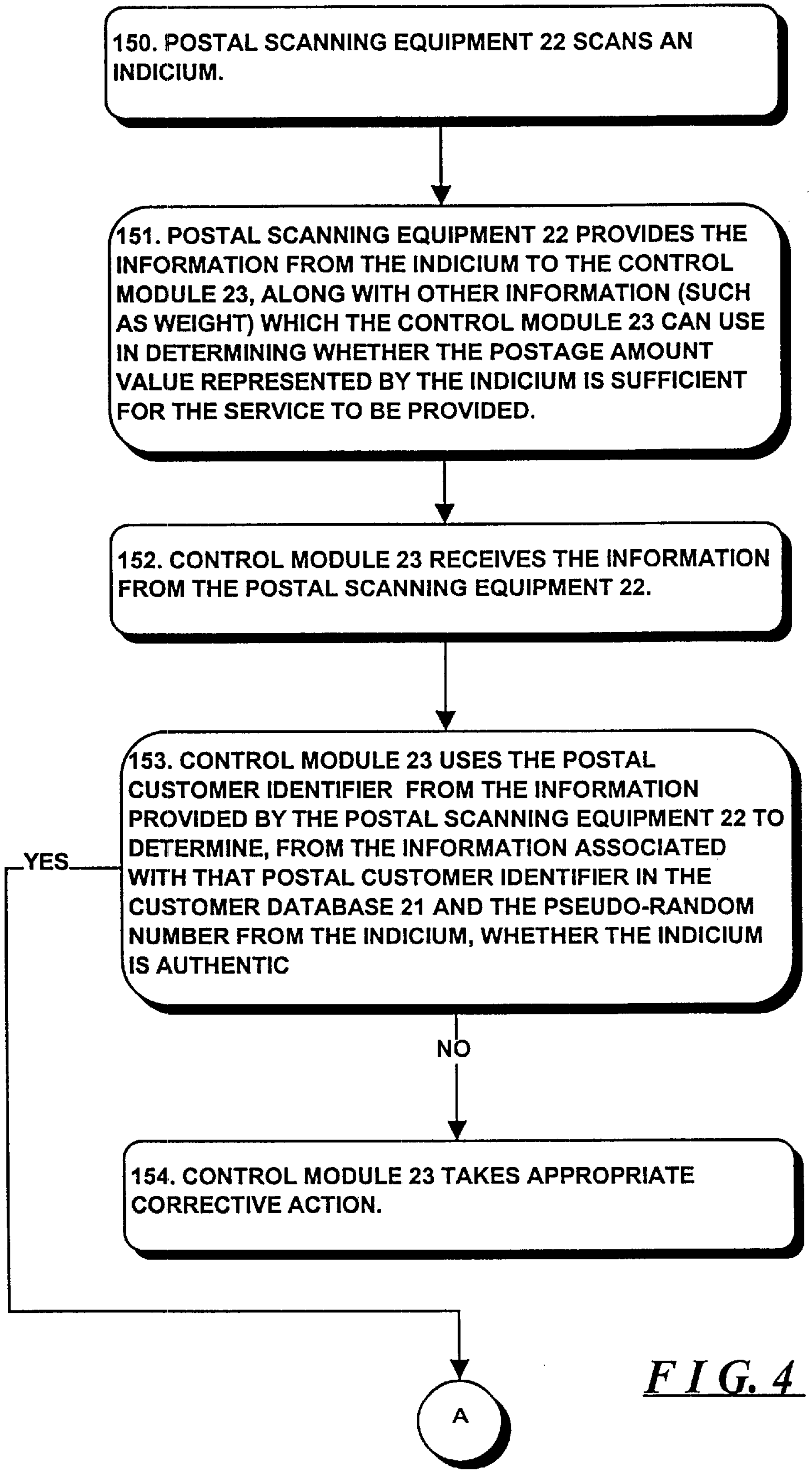

With this background, the operations performed by the postal office system 11 and a postal customer system 12(*n*) in connection with the invention will be described in connection with the flowcharts in FIGS. 2 through 4. FIGS. 2–2B depict operations performed by the postal office system 11 and postal customer system 12(*n*) in connection with purchase of postage during a postage purchase session, FIG. 3 depicts operations performed by the postal customer system 12(*n*) in connection with generation of a postal indicium for printing on an item, and FIG. 4 depicts operations performed by the postal office system 11 in connection with verifying the authenticity of an indicium scanned from an item.

With reference to FIGS. 2–2B, the postal customer system 12(*n*) initially determines that it is to engage in a postage purchase session to purchase "M" pennies of postage (step 100). The postal customer system 12(*n*) can determine to engage in a postage purchase session when, for example, it needs to print an indicium which represents a value which would represent a running total that is larger than the running total amount which it had previously purchased. To this end, following step 100, the postal customer system 12(*n*) can generate a postage purchase request message for transmission to the postal office system 11, the message including information including, for example, identification information for the postal customer system 12(*n*) and the identification of the amount of postage to be purchased (that is, M pennies) (step 101). After the postal office system 11 receives the postage purchase request message (step 102), it can determine whether or not the postal customer has an account (step 103), and, if not, establish an account therefore (step 104), in the process assigning the postal customer a customer identifier. In addition to this identifier, the customer is provided with the value CK(s) which is required by the customer to generate the necessary pseudo-random numbers easily. It is preferable that CK(s) be transferred in a secure manner from the postal office system 11 to the post customer. This can be accomplished by a conventional secure communications protocol such as, for example, the Secure Sockets Layer protocol (SSL). Operations performed in connection with establishing an account (reference step 104) may necessitate transfer of one or more messages between the postal office system 11 and the postal customer system 12(*n*).

Following step 104, or step 103 if the postal office system 11 determines that an account already exists for the postal customer, the postal office system 11 determines from the customer database 21 whether the amount of postage requested would result in the running total being greater than the predetermined maximum amount which can be allocated for the postal customer's postal customer identifier (step 105). If the postal office system makes a positive determination in step 105, it can assign the postal customer another postal customer identifier (step 106) and store information in the customer database 21 representative thereof (step 107). Following step 107, or step 105 if it makes a negative determination in that step, the postal office system generates a postage purchase response message for transmission to the postal customer system 12(*n*) including the permission to print the requested postage, information that the postal customer system 12(*n*) will use in generating the information in the P_RAND_NO pseudo-random number field(s) of the respective postal indicia, and, if the postal office system 11 assigned the postal customer a new postal customer identifier, the new postal customer identifier (step 108).

When the postal customer system 12(*n*) receives the postage purchase response message (step 109), it stores the postage information in the postage database 31 (step 110). This postage information will be used at a later time, during postage dispensing, to generate the pseudo-random number value associated with a particular penny of postage.

As shown at step 111, the postal customer system 12(*n*) generates for each penny of postage, a pseudo-random number by using the information available as provided in the postage purchase response message. As shown at step 112, the postal customer system 12(*n*) stores each pseudo-random number so generated in the postage database associated with the respective penny of postage.

FIG. 3 depicts operations performed by the postal customer system 12(*n*) in connection with generation of a postal indicium for printing on an item. With reference to FIG. 3, when the postal customer system 12(*n*) determines that it is to generate a postal indicia for printing (step 130) it initially determines the postage amount value to be represented by the indicium (step 131). In performing step 131, the postal customer system 12(*n*) may determine the postal amount value from a number of factors, which are known by those skilled in the art, including, for example, the postal rate class or service class as may be provided by an operator and the weight of the item with which the indicium is to be used, as well as rate tables as provided by the postal delivery service. After the postal customer system 12(*n*) has determined a postage amount value to be represented by the indicium, it will determine the running total amount of postage used by the postal customer, including the postage amount value determined in step 131 (step 132). For step 132, the postal customer system 12(*n*) may maintain an accumulator register (not separately shown), which maintains the running total postage amount, and which is incremented by the postage amount value when that value is generated in step 131. After the postal customer system 12(*n*) determines the running total postage amount in step 132, it (that is, the postal customer system 12(*n*)) uses that running total postage amount along with information stored in the postage database 31 to generate the pseudo-random number associated therewith (step 133). At the end of step 133, if the postal customer system 12(*n*) is used in connection with one postal customer identifier value at a time, the postal customer system 12(*n*) will have values for all of the variable fields of the indicium, and so it (that is, the postal customer system 12(*n*)) can print the indicium (step 134) using the printer 32.

It will be appreciated that, if the postal customer system 12(*n*) has sufficient postage available to print the required indicia, then the postal customer system 12(*n*) need to communicate with the postal office system 11 to perform this operation. As a result, a connection need not be established between the postal customer system 12(*n*) and the postal office system 11 unless the customer needs to purchase additional postage because the running total amount of postage required is greater than the running total amount of postage purchased thus far.

It will be appreciated that, if the postal customer system 12(*n*) is used in connection with postal customers having a plurality of postal customer identifiers concurrently, the postal customer identifier value which is to be used in connection with an indicium can be provided by the operator. In such a case, the postal customer system 12(*n*) will preferably maintain in the postage database 31 separate sets of information as described above for the respective postal customer identifiers, and when it (that is, the postal customer system 12(*n*)) is to print an indicium using a particular postal customer identifier, it will make use of the set of information associated with the particular postal customer identifier in connection with steps 130 through 134 described above.

FIG. 4 depicts operations performed by the postal office system 11 in connection with verifying the authenticity of an indicium scanned from an item. With reference to FIG. 4, when the postal scanning equipment 22 scans an indicium (step 150), it (that is, the postal scanning equipment 22) provides the information from the indicium to the control module 23, along with other information which the control module 23 can use in determining whether the postage amount value represented by the indicium is sufficient for the service to be provided (step 151), such as, for example, the weight of the item with which the indicium is used. The control module 23 receives the information from the postal scanning equipment 22 (step 152) and uses the postal customer identifier from that information to determine, from the information associated with that postal customer identifier in the customer database 21 and the pseudo-random number from the indicium, whether the indicium is authentic (step 153). In performing step 153, the control module 23 will make use of equations (4) through (6) above to verify that the pseudo-random number that is correctly associated with the running total postage amount indicated in the indicium corresponds to the pseudo-random number from the indicium as provided by the postal scanning equipment 22 in step 151. If the control module 23 makes a negative determination in step 153, that is, if it determines that the pseudo-random number that is correctly associated with the running total postage amount indicated in the indicium, does not correspond to the pseudo-random number from the indicium, it will proceed to step 154 to take appropriate corrective action.

On the other hand, if the control module 23 makes a positive determination in step 153, that is, if it determines that the pseudo-random number that is correctly associated with the running total postage amount indicated in the indicium, does correspond to the pseudo-random number from the indicium, it will proceed to step 155 to verify, from the information in the customer database, and the running total postage amount and postage amount value represented by the indicium, as provided by the postal scanning equipment 22, that none of the pennies of postage represented by the indicium have already been used in connection with other indicia. If the control module 23 makes a negative determination in step 155, that is, if it determines that at least one of the pennies of postage represented by the indicium has been used in connection with other indicia, it will proceed to step 156 to take appropriate corrective action. On the other hand, if the control module 23 makes a positive determination in step 155, that is, if it determines that none of the pennies of postage represented by the indicium has been used in connection with other indicia, it will proceed to step 157 to mark, in the customer database, the pennies of postage represented by the indicium as having been used. Thereafter, the control module 23 can notify the postal scanning equipment that the requested postal delivery service is to be provided in connection with the item (step 158).

The invention provides a number of advantages. In particular, the invention provides an arrangement which facilitates printing by a postal customer of postal indicia for use in connection with items to be mailed using any printer, after the postal customer has purchased sufficient postage, but without the need for additional mechanisms such as the postal security device (PSD) contemplated by the U.S. Postal Service's IBIP. In addition, the invention provides an arrangement such that the postal indicia represents a relatively small amount of information, in comparison to the amount contemplated by the IBIP, and thus can be printed using an easily-scanned one-dimensional barcode. Further, the invention provides an arrangement by which the postal indicia can be readily authenticated, using a pseudo-random number generated using information that is known only by the postal customer and postal delivery service, thus facilitating purchasing of postage over an insecure network such as the Internet, using a methodology selected so that the postal customer can generate the pseudo-random numbers for postage that he or she has purchased, but not for postage that he or she has not purchased.

It will be appreciated that numerous modifications may be made to the invention. For example, the specific operations and sequence of operations performed by the postal office system 11 and postal customer system 12(*n*) may differ from those described above in connection with FIGS. 2 through 4. In addition, although the postage indicia have been described as having a particular structure and order of concatenated fields, with each field representing a particular number of bits, it will be appreciated that the indicia may have a different structure or order and different numbers of bits.

Furthermore, although the postal office system 11 and postal customer system 12(*n*) have been described as using the BBS algorithm in connection with generation of pseudo-random numbers for use in authenticating the respective indicia, it will be appreciated that other algorithms may be used. Preferably, the algorithms will have at least the properties (i), (iii) and (iv) described above. Depending on the degree of security which may be desired in connection with the transfer of information relating to purchase of postage and distribution of the information used by a postal customer system 12(*n*) in generating the pseudo-random numbers, property (ii) or (ii') may or may not be considered necessary.

For example, if the information to be transferred is encrypted, or is otherwise transferred in a relatively secure manner, property (ii) or (ii') may not be needed.

In addition, although the postal office system 11, in particular the customer database 21, has been described as storing information relating to all pennies of postage which have been purchased by a postal customer (that is, as associated with a particular postal customer identifier), to reduce the amount of information stored in the customer database 21, the control module 23 can delete information for pennies below the first penny which has not been used provided a sufficient amount of time has elapsed for all used pennies to have passed through the postal office system 11.

Furthermore, although the postal office system 11 and postal customer system 12(*n*) have been described as transferring particular types of information during a postage purchase session, it will be appreciated that other and additional types of information can be transferred. For example, the postal customer system 12(*n*) can transfer information relating to indicia which have been printed, such as source and destination address information, which the postal office system 11 can use for tracking and tracing purposes, mail volume analysis, and so forth, and in addition, can be used to protect against fraud.

In addition, because the postal customer system 12(*n*) is described as using suitably programmed computer systems, the migration of a postal customer system 12(*n*) from one computer to another is readily and easily accomplished.

Furthermore, although the invention has been described in connection with generation and authentication of postal indicia, it will be appreciated that the invention can be used in connection with generation of indicia of many types and for many purposes. For example, the invention can be readily used in connection with generation and authentication of money orders each representing a value within a previously paid-for range of values, generation and authentication of certified identifiers that can be used to track physical objects, and other types of indicia which will be apparent to those skilled in the art.

In addition, although the postal customer system 12(*n*) as using, for successive indicia, increasing ones of the pennies of purchased postage, toward the most recently purchased total $B_k$, it will be appreciated that the postal customer system 12(*n*) may, for successive inidica, use decreasing ones of the pennies of purchased postage, descending from the most recently purchased total $B_k$, or any other convenient order.

Furthermore, it will be appreciated that the postal customer system 12(*n*) can either generate the appropriate elements of the pseudo-random sequence at the time that an indicium is generated, or alternatively it may generate the elements for all of the pennies of postage that are purchased when or sometime after purchase for use when an indicium is generated.

In addition, it will be appreciated that, if, after a postal customer system 12(*n*) has generated an indicium, but the item with which the indicium was to be used has not been mailed, the postal customer system 12(*n*) can either recover the pennies associated therewith for use in connection with other inidicia, or the postal office system 11 may issue a credit therefor.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A postage metering system for generating and authenticating an indicium representative of a postage value comprising an element in an indicium value sequence defined by a selected maximum postage value, the system comprising a postage meter and an indicium authenticator, A. the postage meter being configured to generate the indicium, the indicium having an indicium value field for receiving the postage value and a random number field for receiving a random number, the postage meter being configured to generate the random number according to a predetermined methodology using random number generating information, the random number generating information including a seed value and another value, the seed value being a function of the selected maximum postage value and the other value, the predetermined methodology having the characteristics that (i) a random number sequence is generated, each random number in the random number sequence being associable with an element of the indicium value sequence, (ii) values of the random numbers in the random number sequence have values which are a function of the selected maximum postage value, (iii) the postage meter can readily generate values of the random numbers in the random number sequence associable with postage values which are less than the maximum postage value, and (iv) the postage meter cannot readily generate values of the random numbers in the random number sequence associable with values in the indicium value sequence which are more than the maximum postage value, the postage meter using as the random number for the random number field the random number value from the random number sequence associated with the postage value in the indicium value sequence, B. the indicium authenticator being configured to authenticate the indicium by determining whether the random number value in the random number field corresponds to a correct random number for the postage value in the indicium value field as determined by the predetermined methodology.

2. A system as defined in claim 1 in which the indicium authenticator is configured to provide the random number generating information to the postage meter.

3. A system as defined in claim 2 in which the postage meter is configured to request an updated maximum postage value from the indicium authenticator, the indicium authenticator being configured to provide a new seed value in response the updated maximum postage value, and the predetermined methodology further having the characteristic that the indicium authenticator can readily generate values of the random numbers in the random number sequence which are greater than the predetermined maximum value.

4. A postage meter for generating an indicium representative of a postage value comprising an element in an indicium value sequence defined by a selected maximum postage value, the postage meter being configured to generate the indicium, the indicium having an indicium value field for receiving the postage value and a random number field for receiving a random number, the postage meter being configured to generate the random number according to a predetermined methodology using random number generating information, the random number generating information including a seed value and another value, the seed value being a function of the selected maximum postage value and the other value, the predetermined methodology having the characteristics that (i) a random number sequence is generated, each random number in the random number sequence being associable with an element of the indicium value sequence, (ii) values of the random numbers in the random number sequence have values which are a function of the selected maximum postage value, (iii) the postage meter can readily generate values of the random numbers in the random number sequence associable with values in the indicium value sequence which are less than the maximum postage value, and (iv) the postage meter cannot readily generate values of the random numbers in the random number sequence associable with values in the indicium value sequence which are more than the maximum indicium value, the postage meter using as the random number for the random number field the random number value from the random number sequence associated with the postage value in the indicium value sequence.

5. A method of generating and authenticating an indicium representative of a postage value comprising an element in an indicium value sequence defined by a selected maximum postage value, the method comprising the steps of A. enabling a postage meter to generate the indicium, the indicium having an indicium value field for receiving the postage value and a random number field for receiving a random number, the postage meter being enabled to generate the random number according to a predetermined methodology using random number generating information, the random number generating information including a seed value and another value, the seed value being a function of the selected maximum postage value and the other value, the predetermined methodology having the characteristics that (i) a random number sequence is generated, each random number in the random number sequence being associable with an element of the indicium value sequence, (ii) values of the random numbers in the random number sequence have values which are a function of the selected maximum postage value, (iii) the postage meter can readily generate values of the random numbers in the random number sequence associable with values in the indicium value sequence which are less than the maximum postage value, and (iv) the postage meter cannot readily generate values of the random numbers in the random number sequence associable with values in the postage value sequence which are more than the maximum postage value, the postage meter using as the random number for the random number field, the random number value from the random number sequence associated with the indicium value in the indicium value sequence, and B. enabling an indicium authenticator to authenticate the indicium by determining whether the random number value in the random number field corresponds to a correct random number for the postage value in the indicium value field as determined by the predetermined methodology.

6. A method as defined in claim 5 further comprising the step of enabling the indicium authenticator to provide the random number generating information to the postage meter.

7. A method as defined in claim 6 further comprising the step of enabling the postage meter to request an updated maximum postage value from the indicium authenticator, the indicium authenticator being enabled to provide a new seed value in response to the request, the predetermined methodology further having the characteristic that the indicium authenticator can readily generate values of the random numbers in the random number sequence which are greater than the predetermined maximum value.

8. A method of claim 7 further including the steps of:

enabling the indicium authenticator to determine if the postage meter corresponds to a postage customer;

if so, sending the postage meter a seed value that corresponds to the requested maximum postage value.

9. A method of claim 8 further including the steps of:

enabling the postage meter to determine if the postage value is included within the selected maximum postage value;

if not, sending a message to the indicium authenticator that includes a new selected maximum postage value;

if so, enabling the postage meter to generate the indicium without contacting the indicium authenticator, the postage meter using the seed value that corresponds to the selected maximum postage value.

10. A method of claim 9 further including the steps of enabling the indicium authenticator to respond to the request with new random generator information; and enabling the postage meter to generate the indicium using the new random generator information.

11. A method of claim 10 wherein the step of requesting further includes payment for the increase in the requested maximum postage value over the prior maximum postage value.

12. A method of enabling a postage meter to generate an indicium representative of a postage value comprising an element in an indicium value sequence defined by a selected maximum postage value, the postage meter including an indicium generator being configured to generate the indicium, the indicium having an indicium value field for receiving the postage value and a random number field for receiving a random number, the postage meter being configured to generate the random number according to a predetermined methodology using random number generating information, the random number generating information including a seed value and another value, the seed value being a function of the selected maximum postage value and the other value, the predetermined methodology having the characteristics that (i) a random number sequence or selected portions thereof are generated, each random number in the random number sequence being associable with an element of the indicium value sequence, (ii) values of the random numbers in the random number sequence have values which are a function of the selected maximum value, (iii) the postage meter can readily generate values of the random numbers in the random number sequence associable with values in the indicium value sequence which are less than the maximum postage, and (iv) the postage meter cannot readibly generate values of the random numbers in the random number sequence associable with values in the indicium value sequence which are more than the maximum postage value, the postage meter using the random number value from the random number sequence associated with the indicium value in the indication value sequence as the random number for the random number field.

13. A method as defined in claim 12 further including the step of enabling the postage meter to generate a plurality of indicia, each indicium in the plurality having a unique indicium value sequence.

14. A method as defined in claim 12 further including the steps of determining if the postage value is included in the selected maximum postage value, if so, including a corresponding random number in the indicium, the random number being generated using a seed value that corresponds to the maximum postage value;

if not, requesting a new maximum postage value and using a corresponding new seed value to generate the random number for the indicium.

15. A method of claim 12 wherein the step of requesting further includes payment for the increase in the requested maximum postage value over the prior maximum postage value.

* * * * *